(12) United States Patent
Zentner

(10) Patent No.: US 10,407,779 B2
(45) Date of Patent: Sep. 10, 2019

(54) USE OF A CATALYST IN A BASE COATING TO IMPROVE THE STRIPPABILITY OF SUBSEQUENT COATINGS

(71) Applicant: Akzo Nobel Coatings International B.V., Arnhem (NL)

(72) Inventor: Mark Robert Zentner, Gurnee, IL (US)

(73) Assignee: Akzo Nobel Coatings International B.V., Arnhem (NL)

(*) Notice: Subject to any disclaimer, the term of this patent is extended or adjusted under 35 U.S.C. 154(b) by 0 days.

(21) Appl. No.: 14/988,961

(22) Filed: Jan. 6, 2016

(65) Prior Publication Data

US 2016/0115599 A1 Apr. 28, 2016

Related U.S. Application Data

(63) Continuation of application No. 13/392,127, filed as application No. PCT/EP2010/062408 on Aug. 25, 2010.

(60) Provisional application No. 61/237,490, filed on Aug. 27, 2009.

(30) Foreign Application Priority Data

Oct. 15, 2009 (EP) .................................. 09173113

(51) Int. Cl.
*B08B 3/08* (2006.01)
*C23G 5/00* (2006.01)
*C09D 9/00* (2006.01)

(52) U.S. Cl.
CPC ................ *C23G 5/00* (2013.01); *B08B 3/08* (2013.01); *C09D 9/00* (2013.01)

(58) Field of Classification Search
CPC ........................................................ C09D 9/00
USPC ........................................................ 134/2, 38
See application file for complete search history.

(56) References Cited

U.S. PATENT DOCUMENTS

| | | | |
|---|---|---|---|
| 3,654,940 A | 4/1972 | Ritzi | |
| 5,215,675 A | 6/1993 | Wilkins et al. | |
| 5,830,836 A | 11/1998 | Smith et al. | |
| 5,954,890 A * | 9/1999 | Smith | C09D 9/00 134/2 |
| 2002/0022682 A1* | 2/2002 | Wallace | C04B 26/02 524/265 |

(Continued)

FOREIGN PATENT DOCUMENTS

| | | |
|---|---|---|
| CN | 101395231 A | 3/2009 |
| EP | 0237111 A2 | 9/1987 |

(Continued)

OTHER PUBLICATIONS

English Abstract of JPS56-70062.

(Continued)

*Primary Examiner* — Katelyn B Whatley
(74) *Attorney, Agent, or Firm* — Pauly, DeVries Smith & Deffner LLC; Nirav N. Patel

(57) ABSTRACT

The invention is a method of stripping one or more additional coats covering a barrier primer coat that covers a surface. The barrier coat contains a catalyst, such as manganese dioxide and, or, manganese carbonate, for the decomposition of hydrogen peroxide. The top coat of the covered surface is contacted with the stripping agent at decomposition reaction conditions.

11 Claims, 4 Drawing Sheets

(56) References Cited

U.S. PATENT DOCUMENTS

| | | | |
|---|---|---|---|
| 2005/0288456 A1* | 12/2005 | Morkunas | C08G 18/3215 |
| | | | 525/528 |
| 2006/0000488 A1* | 1/2006 | Claar | B44D 3/16 |
| | | | 134/1.1 |
| 2007/0172662 A1* | 7/2007 | Ferencz | C09D 5/032 |
| | | | 428/411.1 |
| 2007/0249484 A1* | 10/2007 | Benkhoff | B01J 31/0205 |
| | | | 502/5 |
| 2010/0129524 A1 | 5/2010 | Sternberger et al. | |

FOREIGN PATENT DOCUMENTS

| | | |
|---|---|---|
| JP | S56-70062 | 6/1981 |
| RU | 2002123933 A | 3/2004 |

OTHER PUBLICATIONS

Office Action dated Jun. 5, 2013 for corresponding Chinese Application No. 201080036144.2.
English Translation of Office Action dated Jun. 5, 2013 for corresponding Chinese Application No. 201080036144.2.
Office Action dated Jan. 13, 2014 for corresponding Chinese Application No. 201080036144.2.
English Translation of Office Action dated Jan. 13, 2014 for corresponding Chinese Application No. 201080036144.2.
Search Report of corresponding European Application No. 09173113.3, dated Jun. 1, 2010.
Search Report of corresponding International Application No. PCT/EP2010/062408, dated Jan. 12, 2011.

* cited by examiner

USE OF A CATALYST IN A BASE COATING TO IMPROVE THE STRIPPABILITY OF SUBSEQUENT COATINGS

CROSS-REFERENCE TO RELATED APPLICATIONS

This application is a continuation of U.S. Patent Application No. 13/392,127, filed Feb. 24, 2012, which is a national stage filing under 35 U.S.C. § 371 of PCT/EP2010/062408, filed Aug. 25, 2010, which claims priority to European Patent Application No. 09173113.3, filed Oct. 15, 2009, and U.S. Provisional Patent Application No. 61/237,490, filed on Aug. 27, 2009, the contents of which are incorporated herein by reference in their entirety.

FIELD OF THE INVENTION

The field to which this invention relates is the stripping of coatings from a surface.

PRIOR ART

Systems that offer very good intercoat adhesion and chemical resistance are difficult or impossible to strip with mild paint removers such as those based on emulsions of benzyl alcohol in water.

A number of different resin systems and additives have been tried as or in intermediate coatings and barrier primers to obtain the best possible balance between rain erosion and strippability. To date, none of them have provided the balance required for acceptable performance.

References such as U.S. Pat. Nos. 3,654,940; 5,830,836; and 5,954,890 disclose use of hydrogen peroxide for stripping polymeric coatings from surfaces, particularly non-porous substrates, such as an aircraft body. JP 56.070.062 discloses a thermosetting primer containing manganese dioxide. No reference, however, hints to the use of hydrogen peroxide stripping agent for removal of an intermediate coat and/or a topcoat from a barrier primer coat that contains a catalyst for decomposing hydrogen peroxide.

SUMMARY OF THE INVENTION

In an embodiment, the present invention is a method of stripping one or more additional coats from a barrier primer coat containing a catalyst for the decomposition of hydrogen peroxide, comprising contacting the top coat of a surface covered with the primer and one or more additional coats with a stripping agent comprising hydrogen peroxide at decomposition reaction conditions.

Other embodiments of the invention relate to details such as catalyst composition, stripping reaction conditions and relative amounts of various materials involved, all of which will be described with greater specificity herein below.

DETAILED DESCRIPTION OF THE INVENTION

Figure 1:
FIG. 1 is a depiction of the sample coatings made in connection with the testing done on the coating system of Example 1.

Hydrogen peroxide decomposition can be achieved by different catalytic materials. There are generally two families of compounds where catalytic conditions will cause decomposition. Certain transition metals and their salts are one family of compounds available for use along with organic, and more specifically metallo-organic compounds that possibly could be bound or cross linked into a composite matrix. In one embodiment, the catalytic material is in a solid phase, possibly as a crystalline solid or adsorbed onto or absorbed into a solid and inert carrier that forms the barrier primer coat, and the oxidizer is carried in the liquid (usually water) phase that comes in contact with the solid.

It is an objective of the present invention to build into the solid phase coating a catalyst system that will trigger a component reaction in the liquid phase stripper product.

Examples of metals that are catalytically active with hydrogen peroxide are shown in the table below:

| Metals | Metals in the form of Hydroxides |
|---|---|
| Se, Fe, Cu, Cr, Zn, Mn, Ag, Ni, Co, Ti, V, Pb, Hg, Cd, Mo, W, Pt, Pd, Os (total of 17) | Se, Fe, Cu, Cr, Mn, Ag, Ni, Co, Pb, Hg, Os (total of 11) |

Molybdate and tungstate are also effective decomposition catalysts for hydrogen peroxide. Also, Titanium Dioxide has catalytic properties if the proper crystal structure version is used. In addition to the metals in elemental form, it is contemplated that they can be in the form of a substituent of a larger molecule or compound. In one embodiment, oxides of the above elements can be used as active catalysts for formulation of the barrier primer coat. Moreover, in other embodiments, combinations of some of these oxides/hydroxides can be used as the catalyst. In one embodiment of the invention, samarium can be used as the catalyst. It is believed that samarium can accelerate the decomposition of hydrogen peroxide without generating hydroxyl radicals. Depending on the coating system, this may be an important consideration where barrier primer integrity is concerned. Other solid state forms of metallic compounds may also be considered.

Organics provide a very broad classification but may offer a very effective approach to the chemistry of the present invention. In one embodiment, oxides and other insoluble forms of metallic compounds are embedded into the primer layer so as to be available to the hydrogen peroxide as it penetrates the coating system. However, depending on the coating system, this can potentially cause issues with coating properties that may degrade product performance and be unacceptable. Thus, in another embodiment, polymer functionality is built into the layer which has chelating capability and the polymer is loaded with the metal catalyst. In such an embodiment, the catalyst loading is moved from the macroscopic scale (embedded solids) past the nanoscale to the molecular level. It is believed that in certain coating systems, such loading can improve strippability while minimizing impact on coating product performance.

The present invention involves use of a catalyst additive to a base coating to improve the strippability of subsequent coatings applied over the base coating with peroxide based strippers while maintaining or improving other performance characteristics of the base coating and coating system. It is believed that oxygen gas produced by the decomposition of hydrogen peroxide helps to lift and remove coatings from the barrier primer containing the catalyst. One specific example is addition of manganese dioxide to a high solids 2K epoxy amine barrier primer to improve the strippability of a 2K urethane intermediate coating and 2K urethane topcoat over this primer.

The coating system of the present invention has particular utility for a composite substrate comprising the exterior of aircraft. In an embodiment, the system includes a permanent barrier primer applied to the composite and a decorative topcoat, with or without an intermediate coating, applied to this primer. The barrier primer preferably has excellent adhesion to the composite substrate and the subsequent coating or coatings applied over the primer preferably has excellent intercoat adhesion (i.e. rain erosion resistance) and chemical resistance to solvents, jet fuels, hydraulic and other fluids that the coating will be exposed to. In an embodiment of the invention, the coating system can be removed with chemical based paint removers down to the barrier primer without damage or removal of the barrier primer itself.

Hydrogen peroxide based strippers are commercially used to remove paint from airplanes because they are non-corrosive and safe to use when proper precautions are followed. However, peroxide based strippers have drawbacks in that they may not be effective in stripping multiple layers of conventional coatings that have strong adherence between layers. It has been found that such layers can be effectively stripped according to the present invention which includes an appropriate catalyst in the primer coat.

Peroxide stripping agents comprise solutions of the hydrogen peroxide. Most of the commercial peroxide based strippers contain 1 to 7 wt % peroxide. This is a practical range for storage stability and minimizing corrosion to metals and other substrates. Special labeling is also needed for blends containing over 7% peroxide. However, formulations up to 20% peroxide have been tried. In an embodiment of the invention, the hydrogen peroxide concentration can be as low as about 1%. In other embodiments, the concentration is in the range of about 1 to about 10%, or about 2 to about 9%, or about 4 to about 7%. For example, in an embodiment where the catalyst is manganese, a level at 1% is effective, but levels of 4 to 7% are preferred. In other embodiments, levels higher than 7% also work quite well.

Most commercial strippers today are based on emulsified benzyl alcohol as a starting point. In addition to the peroxide, a number of other "activators" can be used, e.g., solvents. A number of solvents can be used including high boiling aromatics, glycol ethers, N-methyl pyrrolidone and others. Solvents, when present, are usually used in the range of 1 to 10% to enhance swelling and diffusion through the film being stripped.

A commercially available stripping agent useful in connection with the invention is Sea to Sky® SPC-909, which is a peroxide based paint stripper that is a stable emulsion of benzyl alcohol in water. It contains roughly 40% benzyl alcohol, 50% water and 4 to 7% hydrogen peroxide. Corrosion inhibiting and other additives are also used. Other hydrogen peroxide based paint removers are commercially available and can also be used.

In embodiments of the invention, catalyst levels can range from about 0.01 to about 35%, or about 0.1 to about 30%, or about 0.2 to about 25%, or about 0.5 to about 20%, by volume of dry film in the primer coat, although lower or higher levels may work. In embodiments of the invention, the catalyst is chosen from manganese dioxide and manganese carbonate alone or in combination. It is believed the catalysts according to the invention accelerate the decomposition of hydrogen peroxide to water and oxygen gas. In an embodiment where manganese dioxide is used alone, its concentration range can be from about 0.1 to about 20%, or about 0.3 to about 15%, or about 0.5 to 10% by volume of dry film. In an embodiment where manganese carbonate is used alone, its concentration range can be from about 1 to about 30%, or about 2 to about 25%, or about 3 to about 20% by volume of dry film.

In testing embodiments of the invention, an intermediate coating and topcoat were applied to barrier primers containing various levels of manganese dioxide, including a control having 0% manganese dioxide. Intercoat adhesion between coats for the control and coatings having barrier primers containing manganese dioxide, as tested by rain erosion and phosphate ester hydraulic fluid (SKYDROL®) resistance, were equivalent. However, strippability with the primers containing the manganese dioxide was greatly enhanced with peroxide based strippers. The control system with 0% $MnO_2$ did not strip after 24 hours exposure to a commercially available strippers having 7% hydrogen peroxide (SPC-909). The systems with 3 and 10% manganese dioxide in the barrier primer were completely stripped to the barrier primer in 4 to 5 hours with the SPC-909 stripper. The barrier primer was maintained intact.

It is believed that the hydrogen peroxide containing stripper permeates thru the coating system to the barrier primer. It then comes into contact with the catalyst, e.g., manganese dioxide, on the surface of the barrier primer. This contact results in rapid decomposition of the hydrogen peroxide which releases oxygen gas which helps to lift and remove the coatings attached to the barrier primer, but does not remove the barrier primer itself. It is believed that a very high vapor pressure is built up between the barrier primer containing the catalyst, e.g., manganese dioxide, and the coatings above it which overcomes the adhesive forces between the barrier primer and coating above it.

Although the term "barrier primer" as used herein usually is the coating directly applied to the substrate, the barrier primer containing the catalyst may in fact be an intermediate coating that covers one or more coatings that are applied directly to the substrate. In such an embodiment, it is believed the hydrogen peroxide stripper will affect only the coatings that cover the barrier primer and leave the coatings beneath the coating containing the catalyst undisturbed. The barrier primer with the peroxide decomposition catalyst can also be used without an intermediate coating, as shown in Example 8. In Example 8, the final topcoat was applied directly to the barrier primer. Intercoat adhesion was excellent and the topcoat was easily removed from the barrier primer with a hydrogen peroxide containing paint remover.

With regard to decomposition reaction conditions in the method of the invention, stripping may be carried out at ambient temperatures which range from about 20 to 24° C. (68 to 75° F.). It is believed higher temperatures can speed up the decomposition of the peroxide by the catalyst which can in turn speed up stripping time. Higher temperatures can be used, but are not required. Generally, stripping time may range from about 4 to 24 hours, depending on catalyst content and resistance to rain erosion.

In all the examples, the barrier primer was a high solids 2K epoxy amine coating, but with varying amounts and types of catalyst. Barrier primer (BP1) was a control with 0% peroxide catalyst. Barrier primers (BP2, 3 and 4) had 10%, 3% and 1% by dry film volume, respectively, of manganese dioxide. Barrier primer (BP5) had 9% by dry volume manganese carbonate. Barrier primer (BP6) had 8.5% manganese carbonate/0.5% manganese dioxide by dry film volume.

Two different intermediate coatings were used in the examples. Intermediate coating (IC1) was a 2K urethane coating based on a polyester crosslinked with an aliphatic isocyanate and intermediate coating (IC2) was a 2K urethane coating based on an epoxidized soybean oil crosslinked with a carboxyl functional polyester (commercially available from Reichhold as Aroflint 607 and Epotuf 91-314).

The examples all used Eclipse® decorative 2K urethane topcoat as the topcoat layer. Other commercially available aircraft topcoats can be used. One test applied was Rain erosion resistance. Rain erosion resistance is a very severe test for intercoat adhesion for paint systems applied to the exterior fuselage of an aircraft. The rain erosion test was performed as follows: airfoils as shown in the subsequent examples were masked off to expose the leading edge and then coated with the appropriate coating system. The coated airfoils were cured for two weeks at 25° C. (77° F.)/50% RH and then soaked in room temperature water for 24 hours. The airfoils were then immediately placed on a whirling arm apparatus and rotated for 30 minutes at around 500 miles per hour while exposed to simulated rainfall. The airfoils were then inspected for intercoat adhesion failure back from the leading edge. No adhesion loss or slight chipping less than 0.10 inches from the leading edge are desired. Examples 1, 3 and 4 showed excellent rain erosion resistance. Example 2 showed poor rain erosion resistance.

Exposure of a coating system to SKYDROL® (phosphate ester fluid) is a good test for chemical resistance. SKYDROL® is a very aggressive fluid that tends to soften many coating systems. Sample panels prepared according to the examples were tested for chemical resistance as follows: a coated panel was cured for two weeks at 25° C. (77° F)/50% RH. A 1 mm wide by 7 cm long scribe through the coating layers down to the substrate was then made. The panels were then immersed in room temperature SKYDROL® for 30 days. After 30 days, the panels were removed from the test fluid, rinsed off with mineral spirits, and wiped dry to remove the test fluid residue. The panels were then examined for swelling beyond the scribe, and loss of hardness and crosshatch adhesion tests were conducted. Swelling should be less than 1 mm beyond the scribe, pencil hardness should be B minimum and there should be no loss of adhesion. Example 1 showed excellent SKYDROL® resistance with no swelling beyond the scribe, H pencil hardness and no loss of adhesion, while Example 2 showed 2 mm swelling beyond the scribe.

Sample panels prepared in accordance with the invention were also tested for strippability. The strippability test was performed as follows: a coated panel, including the top coat, was cured for 1 week at 25° C. (77° F.)/50% RH followed by 1 week cure at 71° C. (160° F.). The perimeter of panel was taped with aluminum tape to prevent penetration of the stripper at the panel edge. The panel was placed horizontally on a lab bench and paint stripper (e.g., SPC 909) was applied onto the panel using a bristle paint brush to provide a coating of stripper evenly and uniformly over the entire coated surface. After 3 to 4 hours, the stripper was removed with a plastic squeegee using light pressure only. If the stripper did not remove all of the paint down to the barrier primer, it was applied a second time in the same manner as the first application. After 3 to 4 hours, the stripper applied the second time was removed with a plastic squeegee using light pressure only. If the stripper (applied the second time) did not removed all of the paint down to the barrier primer, it was applied a third time in the same manner as the first application. The stripper applied the third time remained on the panel overnight and then was removed with a plastic squeegee the next day. Any remaining stripper and residue was removed with a cloth soaked with isopropanol. The panel was examined and the amount of topcoat and intermediate coating removed was noted. It was also determined if the barrier primer was still intact.

The stripping agents used in the examples to conduct the strippability tests were the SPC 909, stripping agent 022409, TURCO® EA 6930 and TURCO® EA 6950. Stripping agent 022409 was a modified version of the SPC 909 stripping agent, with a modified solvent component, but having similar levels of hydrogen peroxide. TURCO® EA 6930 and EA 6950 are commercially available stripping agents from Henkel Corp. The EA 6930 contains 30-60% Benzyl alcohol, 5-10% hydrogen peroxide and 1-5% D-Limonene, as well as corrosion inhibiting andother additives. The EA 6950 contains 30-60% Benzyl alcohol and 5-10% hydrogen peroxide, as well as corrosion inhibiting and other additives.

Sample panels prepared in accordance with the invention were also tested for dry and wet adhesion according to ASTM D3359 Test Method B guidelines. The dry adhesion test was performed as follows: a coated panel, including the top coat, was cured for one week at 25° C. (77° F.)/50% RH. Five parallel cuts were made 3 mm apart from each other through the coating to the substrate using a sharp razor knife with a 3 mm shim as guide. The cuts were approximately 2 inches long. Then five cuts were made 3 mm apart from each other at an angle approximately 45 degrees to the first set of cuts. Adhesive tape (3M 250) was applied over the cuts and the tape was rubbed firmly with an eraser from the end of a pencil. The tape was then removed rapidly from the panel. The coating was examined for any adhesion loss to the substrate or between the coating layers and the % adhesion loss was determined.

The wet adhesion test was performed in the same manner as the dry adhesion test, except that the following steps were added after the panels were cured for one week at 25° C. (77° F.)/50% RH: the cured panels were immersed in deionized or distilled water for one week at 25° C. (77° F.). After one week, the panels were removed from the water, wiped dry and checked for adhesion within 30 seconds after removal from water following the remaining steps described above (with respect to the dry adhesion test.

EXAMPLES

The following examples illustrate practice of the present invention.

Example 1

Three Layer Coating System with Good Intercoat Adhesion but Poor Strippability a. Barrier Primer (BP1) was applied at 1 mil dry film thickness over a suitable substrate.
b. Intermediate Coating (IC1) was applied at 1 mil dry film thickness over the barrier primer.
c. Decorative topcoat was applied at 2 to 3 mils dry film thickness over the intermediate coating.

Rain erosion, phosphate ester resistance and strippability tests were performed on the composite coating. The resulting test panels are depicted in FIG. 1. A review of the test panels reveals the following results:

Rain erosion resistance (as shown by rain erosion airfoils)—excellent, no adhesion loss
Phosphate ester resistance—excellent, no softening or undercutting along scribe
Strippability—no removal after 24 hours exposure to SPC-909 stripper This system has very good intercoat adhesion as shown by the rain erosion airfoils, and also has excellent resistance to phosphate ester hydraulic fluids. However, it was not stripped with mild paint remover (emulsions of benzyl alcohol in water). It also was not strippable with peroxide based paint strippers.

Example 2

Coating System with Good Strippability but Poor Intercoat Adhesion and Phosphate Ester Resistance a. Barrier Primer (BP1) applied at 1 mil dry film thickness over a suitable substrate.
b. Intermediate Coating (IC2) applied at 1 mil dry film thickness over the barrier primer.
c. Decorative topcoat- 2 component urethane topcoat designated as ECLIPSE® applied at 2 to 3 mils dry film thickness over the intermediate coating.

Figure 2:
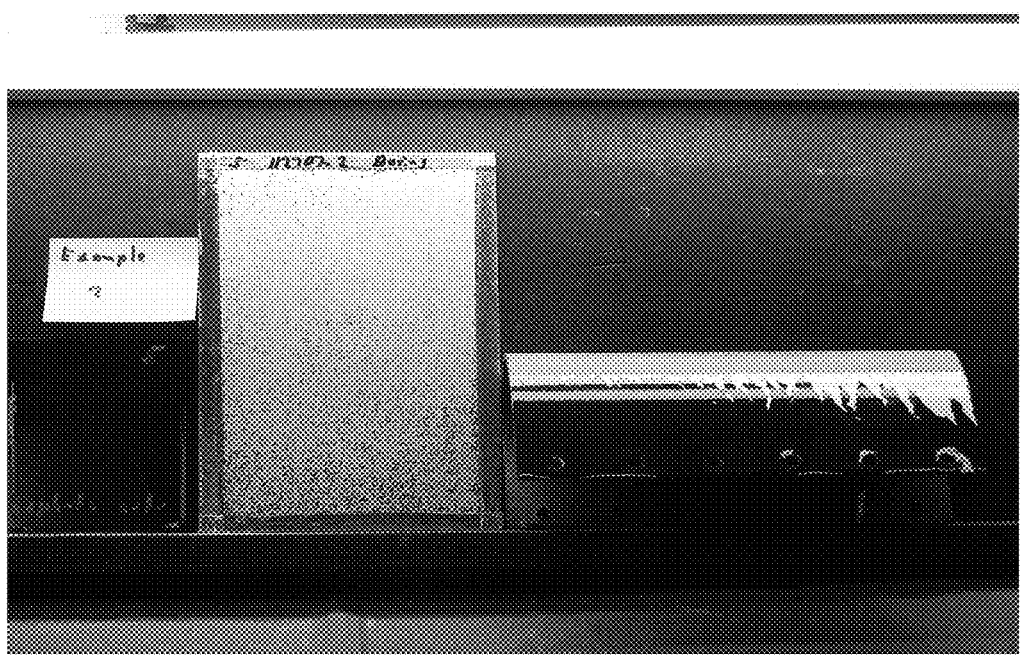
FIG. 2 is a depiction of the sample coatings made in connection with the testing done on the coating system of Example 2.

Rain erosion, phosphate ester resistance and strippability tests were performed on the composite coating. The resulting test panels are depicted in FIG. 2. A review of the test panels reveals the following results:

Rain erosion resistance—poor, adhesion loss up to 1.25 inches from leading edge
Phosphate ester resistance—some undercutting and lifting along scribe
Strippability—topcoat was removed after 24 hours exposure to SPC-909 stripper.

This system was strippable, but had poor rain erosion resistance. Another disadvantage of this system is that phosphate ester hydraulic fluid resistance was marginal.

Example 3

Coating System using Barrier Primer with 10% Manganese Dioxide by Dry Film Volume a. Barrier primer (BP2) applied at 1 mil dry film thickness over a suitable substrate.
b. Intermediate Coating (IC1) applied at 1 mil dry film thickness over the barrier primer.
c. Decorative topcoat- 2 component urethane topcoat designated as ECLIPSE® applied at 2 to 3 mils dry film thickness over the intermediate coating.

Figure 3:
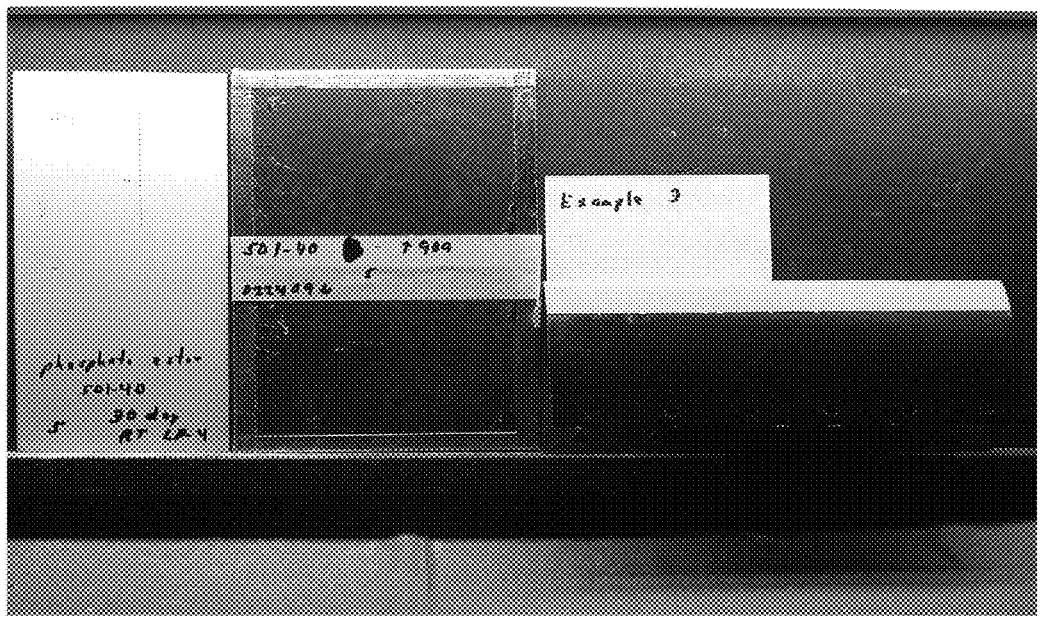
FIG. 3 is a depiction of the sample coatings made in connection with the testing done on the coating system of Example 3.

Rain erosion, phosphate ester resistance and strippability tests were performed on the composite coating. The resulting test panels are depicted in FIG. 3. A review of the test panels reveals the following results:

Rain erosion resistance—excellent, no adhesion loss
Phosphate ester resistance—excellent, no softening or undercutting along scribe
Strippability—decorative and intermediate coats were completely removed down to the barrier primer after 4-5 hours exposure to SPC-909 stripper. Similar results were achieved with the 022409 stripper.

Example 4

Coating System using Barrier Primer with 3% Manganese Dioxide by Dry Film Volume a. Barrier primer (BP3) applied at 1 mil dry film thickness over a suitable substrate.
b. Intermediate Coating (IC1) applied at 1 mil dry film thickness over the barrier primer.
c. Decorative topcoat- 2 component urethane topcoat designated as ECLIPSE® applied at 2 to 3 mils dry film thickness over the intermediate coating.

Figure 4:
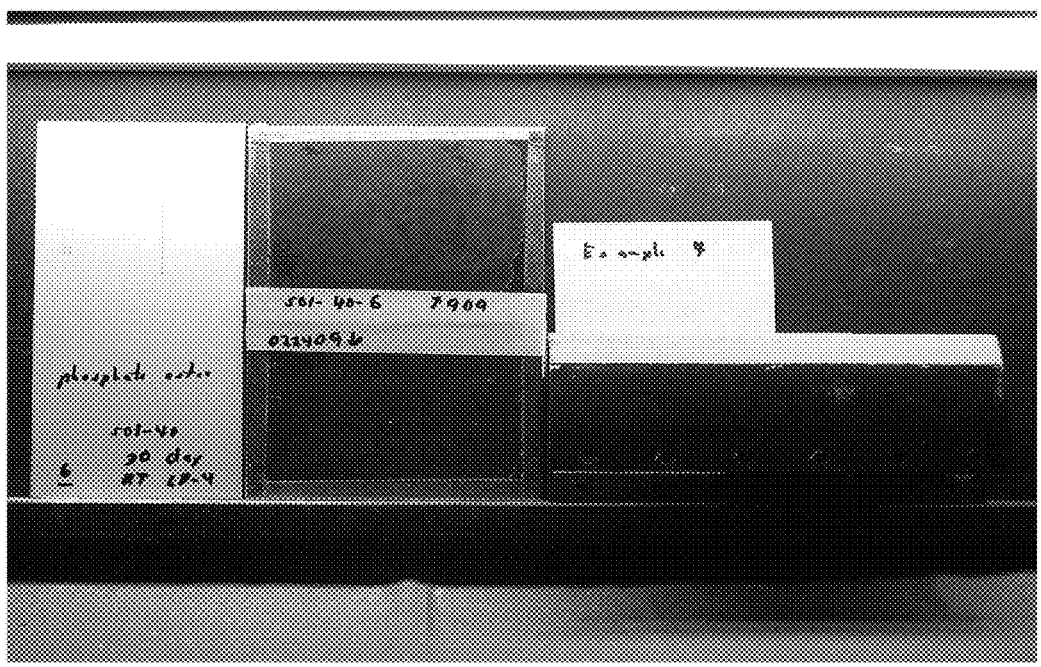
FIG. 4 is a depiction of the sample coatings made in connection with the testing done on the coating system of Example 4.

Rain erosion, phosphate ester resistance and strippability tests were performed on the composite coating. The resulting test panels are depicted in FIG. 4. A review of the test panels reveals the following results:

Rain erosion resistance—excellent, no adhesion loss
Phosphate ester resistance—excellent, no softening or undercutting along scribe
Strippability—decorative and intermediate coats were completely removed down to the barrier primer after 4-5 hours exposure to SPC-909 stripper. Similar results were achieved with the 022409 stripper.

Example 5

Coating System using Barrier Primer with 1% Manganese Dioxide by Dry Film Volume a. Barrier primer (BP4) applied at 1 mil dry film thickness over a suitable substrate.
b. Intermediate Coating (IC1) applied at 1 mil dry film thickness over the barrier primer.
c. Decorative topcoat- 2 component urethane topcoat designated as ECLIPSE® applied at 2 to 3 mils dry film thickness over the intermediate coating.

Dry and wet adhesion and strippability tests were performed on the composite coating.

Figure 5:
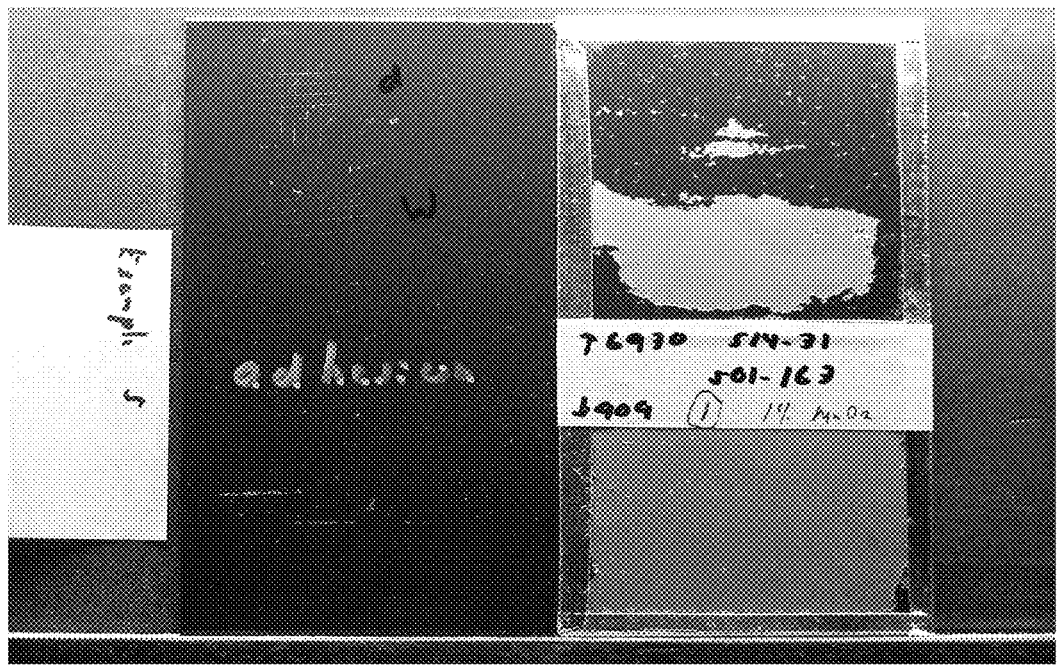
FIG. 5 is a depiction of the sample coatings made in connection with the testing done on the coating system of Example 5.

The resulting test panels are depicted in FIG. 5. A review of the test panels reveals the following results:

Dry and wet adhesion—excellent, no adhesion loss
Strippability—decorative and intermediate coats were completely removed down to the barrier primer after 8 hours exposure to SPC-909 stripper. The decorative and intermediate coats were only partially removed with the EA 6930 stripper.

Example 6

Coating System using Barrier Primer with 9% Manganese Carbonate by Dry Film Volume a. Barrier primer (BP5) applied at 1 mil dry film thickness over a suitable substrate.
b. Intermediate Coating (IC1) applied at 1 mil dry film thickness over the barrier primer.
c. Decorative topcoat- 2 component urethane topcoat designated as ECLIPSE® applied at 2 to 3 mils dry film thickness over the intermediate coating.

Dry and wet adhesion and strippability tests were performed on the composite coating.

Figure 6:
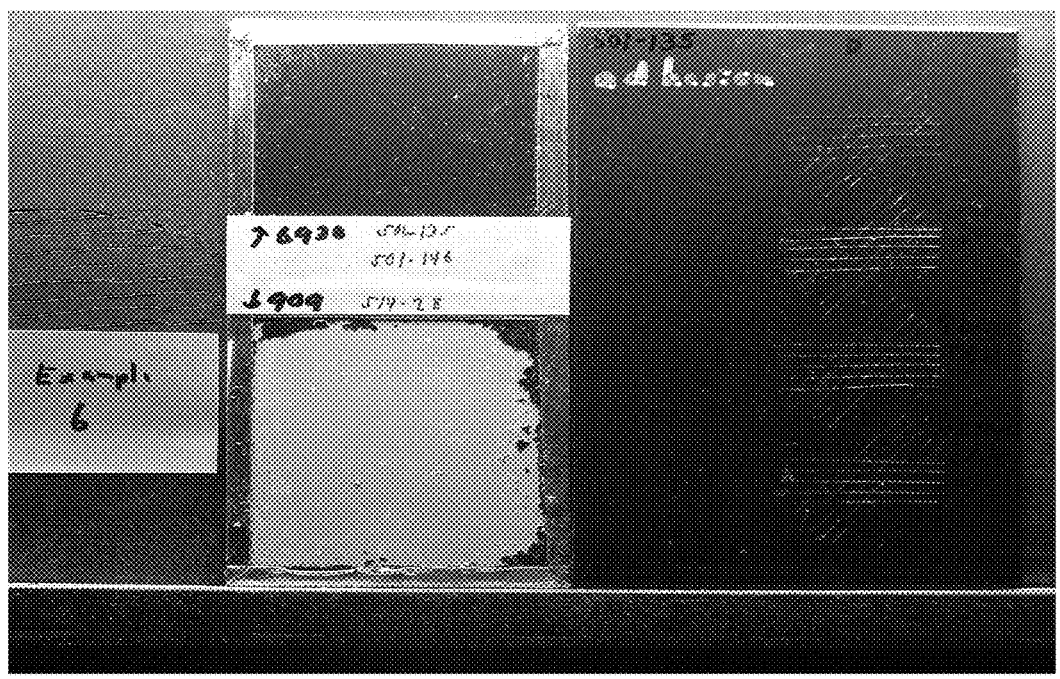
FIG. 6 is a depiction of the sample coatings made in connection with the testing done on the coating system of Example 6.

The resulting test panels are depicted in FIG. 6. A review of the test panels reveals the following results:
Dry and wet adhesion—excellent, no adhesion loss
Strippability—decorative and intermediate coats were completely removed down to the barrier primer after 8 to 24 hours exposure to SPC-909 stripper. The decorative and intermediate coats were only partially removed with the EA 6930 stripper. The decorative and intermediate coats remained mostly intact with the EA 6930 stripper.

Example 7

Coating System using Barrier Primer with 8.5% Manganese Carbonate/0.5% Manganese Dioxide by Dry Film Volume a. Barrier primer (BP6) applied at 1 mil dry film thickness over a suitable substrate.
b. Intermediate Coating (IC1) applied at 1 mil dry film thickness over the barrier primer.
c. Decorative topcoat- 2 component urethane topcoat designated as ECLIPSE® applied at 2 to 3 mils dry film thickness over the intermediate coating.

Dry and wet adhesion and strippability tests were performed on the composite coating.

Figure 7:
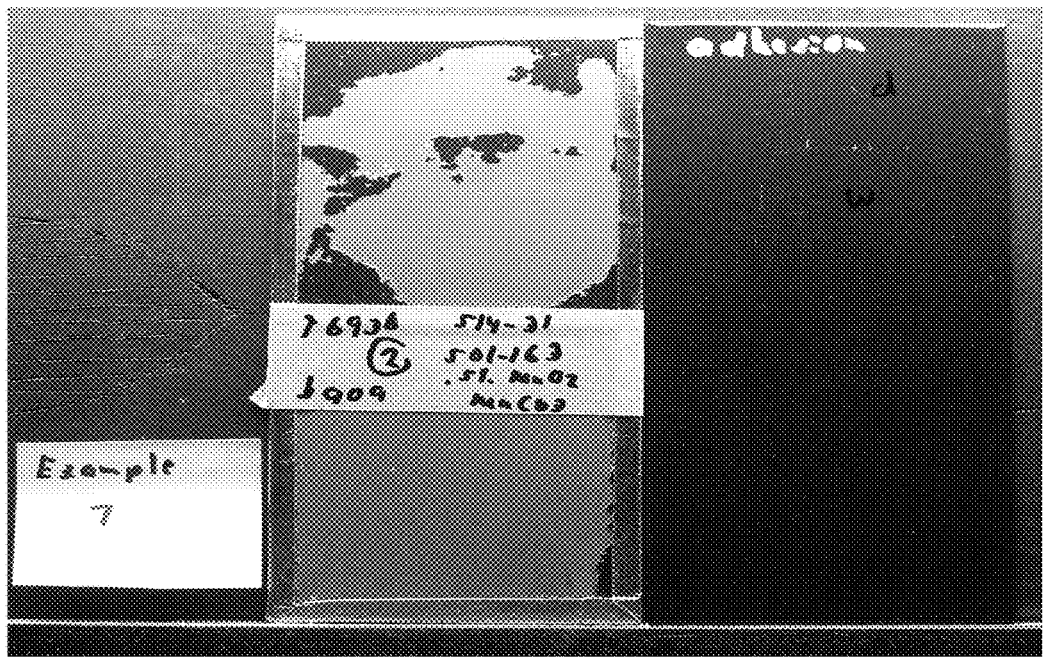
FIG. 7 is a depiction of the sample coatings made in connection with the testing done on the coating system of Example 7.

The resulting test panels are depicted in FIG. 7. A review of the test panels reveals the following results:
Dry and wet adhesion—excellent, no adhesion loss
Strippability—decorative and intermediate coats were completely removed down to the barrier primer after 8 to 24 hours exposure to SPC-909 stripper. The majority of the decorative and intermediate coats were removed with the EA 6930 stripper, but a significant portion of these coats remained attached.

Example 8

Coating System using Barrier Primer with 3% Manganese by Dry Film Volume with Decorative Topcoat and No Intermediate Coating a. Barrier primer (BP3) applied at 1 mil dry film thickness over a suitable substrate.
b. Decorative topcoat-2 component urethane topcoat designated as ECLIPSE® applied at 2 to 3 mils dry film thickness over the intermediate coating.

Dry and wet adhesion and strippability tests were performed on the composite coating.

Figure 8:
FIG. 8 is a depiction of the sample coatings made in connection with the testing done on the coating system of Example 8.

The resulting test panels are depicted in FIG. 8. A review of the test panels reveals the following results:
Dry and wet adhesion—good
Strippability—decorative topcoat down was completely removed to the barrier primer after 4 hours exposure to SPC-909 stripper. Similar results were achieved with the EA 6950 stripper, with only a small amount of the top coat remaining attached at the edges of the panel.

The above examples illustrate the surprising efficacy of the method of the invention for stripping intermediate and/or topcoats from barrier primer coats.

I claim:

1. A method of stripping one or more additional coats covering a 2K epoxy amine barrier primer coat, said method comprising:
   contacting a 2K urethane top coat of an exterior aircraft surface with a stripping agent comprising about 1 to about 7wt % hydrogen peroxide, benzyl alcohol, and about 50% water at decomposition reaction conditions, wherein said 2K epoxy amine barrier primer coat contains a catalyst comprising manganese dioxide and/or manganese carbonate for the decomposition of hydrogen peroxide, and wherein said 2K epoxy amine barrier primer coat and one or more additional coats cover the exterior aircraft surface, the one or more additional coats comprising:
   (i) the 2K urethane top coat as the outermost layer having a surface exposed to the environment, and
   (ii) an intermediate coat comprising a 2K urethane coating based on a polyester crosslinked with an aliphatic isocyanate,
   wherein the 2K epoxy amine barrier primer coat is an undisturbed layer that is not removed by the stripping agent, and
   wherein the 2K epoxy amine barrier primer coat comprises from 1 to 10% by dry film volume of said catalyst.

2. The method of claim 1, wherein said catalyst is a solid embedded in said barrier primer coat.

3. The method of claim 1, wherein said surface is a metal surface.

4. The method of claim 1, wherein the catalyst comprises manganese dioxide and the barrier coat comprises 10% or 3% or 1% by dry film volume of the manganese dioxide.

5. The method of claim 1, wherein the catalyst comprises manganese carbonate and wherein the barrier coat comprises 9% by dry film volume of the manganese carbonate.

6. The method of claim 1, wherein the catalyst comprises manganese carbonate and manganese dioxide and wherein the barrier coat comprises 8.5% by dry film volume of the manganese carbonate and 0.5% by dry film volume of the manganese dioxide.

7. The method of claim 1, wherein the barrier primer coat further comprises a polymer, and wherein the catalyst is chelated by the polymer such that the catalyst is loaded within the barrier primer coat at a molecular level.

8. A method of stripping one or more additional coats covering a 2K epoxy amine barrier primer coat, said method comprising
   contacting a 2K urethane top coat of an exterior aircraft surface with a stripping agent comprising about 1 to about 7wt % hydrogen peroxide, benzyl alcohol, and about 50% water, at decomposition reaction conditions, wherein said 2K epoxy amine barrier primer coat contains a catalyst comprising manganese dioxide, for the decomposition of hydrogen peroxide, and wherein said 2K epoxy amine barrier primer coat and one or more additional coats covers the exterior aircraft surface with said one or more additional coats comprising the 2K urethane top coat as the outermost layer having a surface exposed to the environment, wherein the 2K epoxy amine barrier primer coat comprises 3% by dry film volume of said catalyst.

9. The method of claim 8, wherein said catalyst is a solid embedded in said barrier primer coat.

10. The method of claim 8, wherein said surface is a metal surface.

11. The method of claim 8, wherein the barrier primer coat further comprises a polymer, and wherein the catalyst is chelated by the polymer such that the catalyst is loaded within the barrier primer coat at a molecular level.

* * * * *